United States Patent Office 3,189,089
Patented June 15, 1965

---

3,189,089
METHOD OF ACCELERATING THE SET OF A CEMENT SLURRY IN WELL CEMENTING OPERATIONS
Lloyd G. Carter, Duncan, Okla., assignor to Halliburton Company, Duncan, Okla., a corporation of Delaware
No Drawing. Original application Aug. 6, 1962, Ser. No. 215,091, now Patent No. 3,171,480, dated Mar. 2, 1965. Divided and this application Nov. 27, 1964, Ser. No. 414,398
7 Claims. (Cl. 166—25)

This is a division of application Serial No. 215,091 filed August 6, 1962, now U.S. Patent No. 3,171,480.

The present invention relates to a new and improved method of cementing wells and more particularly to a new and improved method of accelerating the set of a cement slurry in well cementing operations when temperatures are relatively low.

Cementing casing when well temperatures are below about 60° F. and/or surface formations are frozen presents a serious problem in well cementing operations. In performing such well cementing operations in cold weather, it is not unusual for a period of 3–7 days to be required in order for the cement to set sufficiently for drilling operations to be continued. Cement slurries containing a gypsum cement, calcium chloride as an accelerator or other chemical accelerators have been used in such circumstances with varying degrees of success. The chemicals and amounts used must be varied with the particular type of cement used as well as in accordance with temperatures and pressures.

In using chemical accelerators, however, considerable caution must be exercised in order to prevent a flash setting of the cement slurry. In addition to the use of chemicals, the cement is often preheated or warmed, the mixing water is heated, and in some instances the hole is warmed, all for the purpose of controlling setting time.

An ideal or optimum cement slurry is one which remains sufficiently fluid for a length of time to be pumped or introduced into a desired area or location in the well, and which will set or harden reasonably soon after placement so that a minimum of waiting-on-cement time occurs. Lengthy WOC times enhance the cost of drilling operations and are therefore undesirable.

This period of time in which the cement slurry remains sufficiently fluid to be pumpable under the particular well conditions of temperature and pressure is known as thickening time. The thickening time must, of course, be of such length that the desired amount of slurry is mixed and placed in the well. It is well known that temperature or heat hastens the hydration of the cement components and thus decreases the thickening time. It can therefore readily be seen that low well and surface temperatures will prolong the thickening time and if sufficiently low may prevent the cement from setting at all.

Temperatures ranging from 80° F.–120° F. have been found to be particularly ideal in arriving at desired thickening and WOC (waiting on cement) times with most cement slurries. These optimum temperatures do not prevail during winter months or in certain cold climates, and as ordinary cements will not generally set within a reasonable time at temperatures below 60° F., something must be done.

It is therefore a primary object of the present invention to provide a new and improved method of cementing in cold climates wherein the cement slurry is externally heated to provide a desired setting time and waiting-on-cement time.

It is an important object of the present invention to provide a new and improved method of accelerating the set of a cement slurry in well cementing operations which may be applied to all types of cementing jobs.

Another important object of the present invention is to provide a new and improved method of well cementing wherein heat is chemically generated and externally applied to a cement slurry for accelerating the set thereof.

Another object of the present invention is to provide a new and improved method of well cementing, wherein waiting-on-cement time is reduced by the chemical generation of heat inside the casing, thereby heating same and in turn heating the cement slurry in the well.

Still another object of the present invention is to provide a new and improved method of heating a cementing slurry in a well bore utilizing a material which would function as a non-plugging perforating fluid when fracturing or cleaning up the formation around the well bore.

Other objects and advantages of the present invention will be readily apparent from the description hereinbelow.

In carrying out the method of this invention, a well cementing operation is performed in a manner well known in the art. After the cement is mixed and displaced to the desired area in the well bore, a solution or liquid is placed behind the top plug. This liquid is heated a predetermined amount by the reaction of certain metals therewith and heats the casing in the well bore and consequently the cementing column and the formation. Although heat up to 1000° F. or more can be generated in this manner, it is preferred that the amount of heat generated be sufficient to raise the temperature around the cementing column to a temperature of from about 80° F.–120° F. Other desired temperatures may be achieved without departing from the scope of the invention.

There are a number of ways of chemically generating heat and heat producing chemicals which may be used in the present invention. The heat generating operation should be one which has no deleterious effects on the well casing.

Some of these methods are the addition of magnesium pellets, bars or powders to an aqueous acid solution and the addition of metallic sodium to water.

In addition to the heat generating solutions or methods set forth above, it can be appreciated that there are others which can be used without departing from the scope of the invention.

Magnesium pellets (20–40 mesh) and hydrochloric acid are the preferred materials used as the heat generating solution. When acid reacts upon magnesium, a large quantity of heat is liberated in a very short time (8400 B.t.u./lb. of reacted magnesium).

There should be no casing damage from the use of the acid. The magnesium chloride formed by the action of hydrochloric acid on magnesium is not harmful to the casing, nor will precipitation of magnesium hydroxide take place until the pH reaches 9. This will not occur in spent acid.

The quantity of magnesium and acid to use will have to be determined by the particular set of circumstances involved. The desired amount of heat should be the governing factor on the quantity of magnesium.

Some data on the magnesium-hydrochloric acid system is set forth in Table I below:

Table 1.—Data on Mg-HCl system

| | |
|---|---|
| Bulk density of magnesium | 8.5 lbs./gal. or 63.4 lbs./ft.$^3$. |
| Absolute density of magnesium | 1.74. |
| Heat produced per lb. of magnesium | 8400 B.t.u. |
| Volume of hydrogen produced per lb. of magnesium reached at standard temperature and pressure | 14.7 ft.$^3$. |
| Quantity of HCl necessary to dissolve 1 lb. of magnesium | 3 lbs. HCl gas or 2.24 gal. 15% HCl. |
| Theoretical temperature rise when 1 lb. of magnesium is reacted with 2.24 gals. of 15% HCl | 520° F. |

By heating the inside of casing, it is possible to greatly improve the early strength of cement. For example, the compressive strength of API Class A Cement when cured at 120° F. is 905 p.s.i., while the same cement cured at 60° F. for the same length of time will not be set. After six hours at 120° F. a 50-50 Pozmix A Cement without bentonite has a compressive strength of 455 p.s.i., while the same cement will not be set at 60° F. or 80° F. in the same time period.

The hydraulic cement mixes with which this invention may be employed to advantage include those in which any hydraulic cement of the character of Portland cement is the principal cementitious composition, pozzolanic cements or other cements used in well cementing operations. Any of the common aggregates and fillers may be employed in various proportions to meet different structural requirements. These include stone, gravel, slag, sand, pozzolanic materials, fly-ash, and the like, and such specialized materials as metallic aggregates, aluminum powder, etc. The invention is also applicable to neat cement mixes containing no aggregate or filler. All such mixes are comprehended by the term "hydraulic cement mix."

As indicated above, the invention does not preclude the use of other additives, as well as aggregates and fillers, for modifying various characteristics of the mixes for special purposes. For example, air entraining agents, cement dispersing agents, retarders, friction reducers, low fluid loss additives, accelerators, pigments, water-repellant compounds and other additives which may be employed in well cementing operations may also be used without departing from the scope of the invention.

Broadly, the present invention relates to a new and improved method of cementing wells at relatively low temperatures, wherein the cement slurry is pumped or placed in the desired location in the well, and thereafter the well casing or pipe is heated by the reaction of certain metals in aqueous solution displaced therein and thus the cementing column and formation.

The foregoing disclosure and description of the invention is illustrative and explanatory thereof and various changes in the size, shape and materials used, as well as in the details of the procedure and method and particular order of steps may be made within the scope of the appended claims without departing from the spirit of the invention.

What is claimed:

1. A method of cementing wells under relatively cold climatic conditions, comprising the steps of:
    (a) introducing a hydraulic cement slurry into a desired area in a well bore for cementing a well casing therein; and
    (b) chemically generating heat inside the well chasing by injecting an aqueous solution thereinto and subsequently injecting into the aqueous solution a quantity of a metal reactive with said aqueous solution, which metal reacts with said aqueous solution and generates a sufficient amount of heat to heat the well casing, wherein the amount of said metal and the amount of said aqueous solution are such that the reaction thereof and the reaction product formed thereby have substantially no deleterious effect on the well casing, thereby heating the cement slurry and accelerating the set thereof.

2. A method of cementing wells under relatively cold climatic conditions, comprising the steps of:
    (a) introducing a hydraulic cement slurry into a desired area in a well bore for cementing a well casing therein;
    (b) placing a cementing plug on top of the cement slurry;
    (c) introducing a sufficient quantity of an aqueous solution into the casing to cover the area desired to be heated; and,
    (d) placing a predetermined amount of a metal reactive with said aqueous solution, in said aqueous solution, whereby the reaction of the metal with the aqueous solution generates a sufficient amount of heat to heat the casing, wherein the amount of said metal and the amount of said aqueous solution are such that the reaction thereof and the reaction product formed thereby have substantially no deleterious effect on the well casing, and thereby heating the cement slurry to accelerate the set thereof.

3. A method of cementing wells under relatively cold climatic conditions, comprising the steps of:
    (a) introducing a hydraulic cement slurry into a desired area in a well bore for cementing a well casing therein;
    (b) placing a cementing plug on top of the cement slurry;
    (c) introducing a sufficient quantity of an aqueous acid solution into the well casing to cover the area desired to be heated; and,
    (d) placing a quantity of magnesium in the form selected from the group consisting of pellets, bars, and powders, into the aqueous acid solution thereby generating a quantity of heat, heating the casing, wherein the amount of said magnesium and the amount of said acid solution are such that the reaction thereof and the reaction product formed thereby have substantially no deleterious effect on the casing, whereby the cement slurry is heated and the set thereof is accelerated.

4. The method of claim 3, wherein the aqueous acid solution is prepared from hydrochloric acid and a quantity of said acid and magnesium is used whereby the acid is completely spent upon reaction with the magnesium and the casing is left unharmed.

5. A method of cementing wells under relatively cold climatic conditions, comprising the steps of:
    (a) introducing a hydraulic cement slurry into a desired area in a well bore for cementing a well casing therein;
    (b) chemically generating heat inside the well casing by injecting an aqueous acid solution thereinto and subsequently injecting into the acid solution a quantity of magnesium metal which reacts with the acid solution and generates a sufficient amount of heat to heat the well casing, wherein the amount of said magnesium and the amount of said aqueous acid solution are such that the reaction thereof and the reaction product formed thereby have substantially no deleterious effect on the casing, thereby heating the cement slurry and accelerating the set thereof.

6. A method of cementing wells under relatively cold climatic conditions, comprising the steps of:
    (a) introducing a hydraulic cement slurry into a desired area in a well bore for cementing a well casing therein;

(b) placing a cementing plug on top of the cement slurry;
(c) introducing a sufficient quantity of water into the casing to cover the area desired to be heated; and,
(d) placing a predetermined amount of metallic sodium in said water whereby the reaction of the metallic sodium with the water generates a sufficient amount of heat to heat the casing wherein the amount of said metallic sodium and the amount of said water is such that the reaction thereof and the reaction product formed thereby have substantially no deleterious effect on the well casing, and thereby heating the cement slurry to accelerate the set thereof.

7. A method of cementing wells under relatively cold climatic conditions, comprising the steps of:
(a) introducing a hydraulic cement slurry into a desired area in a well bore for cementing a well casing therein;
(b) chemically generating heat inside the well casing by injecting water thereinto and subsequently injecting into the water a quantity of metallic sodium which reacts with the water and generates a sufficient amount of heat to heat the well casing, wherein the amount of said metallic sodium and the amount of said water is such that the reaction thereof and the reaction product formed thereby have substantially no deleterious effect on the well casing, thereby heating the cement slurry and accelerating the set thereof.

References Cited by the Examiner

UNITED STATES PATENTS

| | | | |
|---|---|---|---|
| 2,217,708 | 10/40 | Scaramucci | 166—25 X |
| 2,672,201 | 3/54 | Lorenz | 166—38 X |
| 2,872,982 | 2/59 | Wade | 166—38 |
| 2,975,834 | 3/61 | West et al. | 166—38 X |
| 3,103,973 | 9/63 | Mullen | 166—25 |

OTHER REFERENCES

Gatlin: "Petroleum Engineering, Drilling and Well Completions," Prentice-Hall, Inc., Englewood Cliffs, N.J., 1960, page 173 relied on.

BENJAMIN HERSH, *Primary Examiner.*